(12) United States Patent
Jensen et al.

(10) Patent No.: US 7,191,797 B2
(45) Date of Patent: Mar. 20, 2007

(54) ROTARY DISTRIBUTION APPARATUS

(75) Inventors: Craig Jensen, La Lucia (ZA); Michael Greenfield, La Lucia (ZA); Leon Smith, La Lucia (ZA)

(73) Assignee: The Tongaat-Hulett Group Limited, Kwazulu Natal (ZA)

( * ) Notice: Subject to any disclaimer, the term of this patent is extended or adjusted under 35 U.S.C. 154(b) by 0 days.

(21) Appl. No.: 10/528,345

(22) PCT Filed: Sep. 25, 2003

(86) PCT No.: PCT/IB03/04191
§ 371 (c)(1),
(2), (4) Date: Oct. 27, 2005

(87) PCT Pub. No.: WO2004/029490
PCT Pub. Date: Apr. 8, 2004

(65) Prior Publication Data
US 2006/0124177 A1 Jun. 15, 2006

(30) Foreign Application Priority Data
Sep. 27, 2002 (ZA) .................................. 2002/7798

(51) Int. Cl.
*F16L 27/00* (2006.01)
*F16K 11/074* (2006.01)
(52) U.S. Cl. ................. 137/580; 137/553; 137/625.11; 137/625.15
(58) Field of Classification Search ................. 137/580, 137/625.11, 625.15, 625.46, 553
See application file for complete search history.

(56) References Cited

U.S. PATENT DOCUMENTS 4,263,937 A 4/1981 Rudenko (Continued)

FOREIGN PATENT DOCUMENTS

EP 0832679 A 4/1998

(Continued)

*Primary Examiner*—A. Michael Chambers
(74) *Attorney, Agent, or Firm*—Townsend and Townsend and Crew LLP

(57) ABSTRACT

A rotary distribution apparatus includes a fixed inner distribution member (12) with inner conduit zone; a rotatable distribution member (16) rotatable about the fixed inner distribution member; a plurality of fluid distribution chambers (18) located between the fixed inner distribution member and the rotatable outer distribution member; each fluid distribution chamber having a fixed port (20) in the fixed inner distribution member to which a fixed supply or return conduit for a fluid can in use be connected and at least one distribution port (22) in the rotatable outer distribution member; at least one indexing arrangement (24) including a rotatable indexing member (26) and a fixed indexing member (28); a plurality of passageways (30, 32, 38, 40) extending through each of the rotatable and fixed indexing members (26, 28), the plurality of passageways each having indexing ports (30.2, 32.2, 38.2, 40.2) and connection ports (30.1, 32.1, 38.1, 40.1) with the indexing ports being provided in an indexing surface (36); and the connection ports (30.1, 32.1) of the rotatable indexing member (26) in use being connected to the distribution ports (22) of the distribution chambers by connecting conduits, and the connection ports (38.1, 40.1) of the fixed indexing member in use being connected to process chambers by fixed conduits; so that, in use, when the rotatable outer distribution member, the rotatable indexing member and the connecting conduits are rotated, fluid fed to a fluid distribution chamber (18) is sequentially fed to each process chamber and returned from each process chamber to another fluid distribution chamber (22) as the indexing ports (30.2, 40.2) of the fixed indexing member (28).

12 Claims, 17 Drawing Sheets

U.S. PATENT DOCUMENTS 4,405,162 A * 9/1983 Williams .................... 285/95
4,625,763 A    12/1986 Schick et al.
4,647,077 A * 3/1987 Ethridge et al. .............. 285/98
4,877,054 A * 10/1989 Walter ....................... 137/560
5,478,475 A * 12/1995 Morita et al. ............... 210/676
5,797,413 A * 8/1998 Pollack ........................ 137/1

FOREIGN PATENT DOCUMENTS

WO    WO 2004/029490 A1 *  4/2004

* cited by examiner

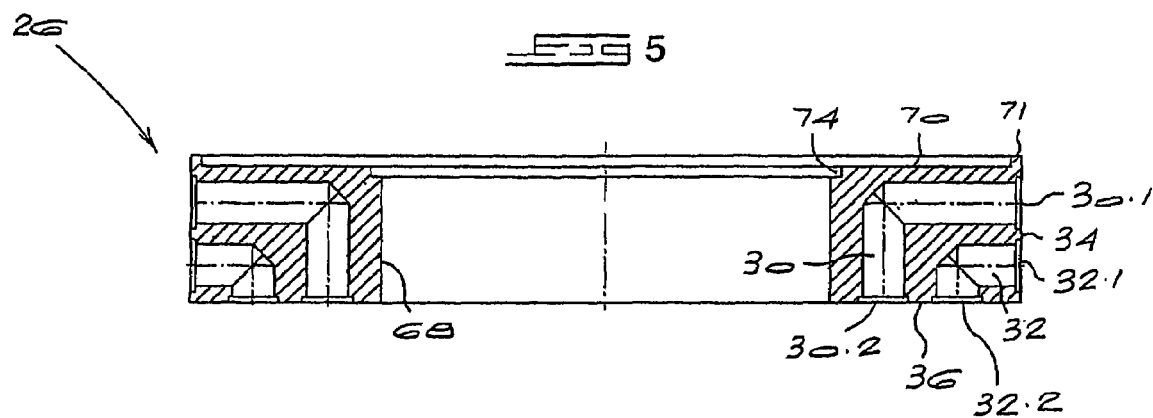
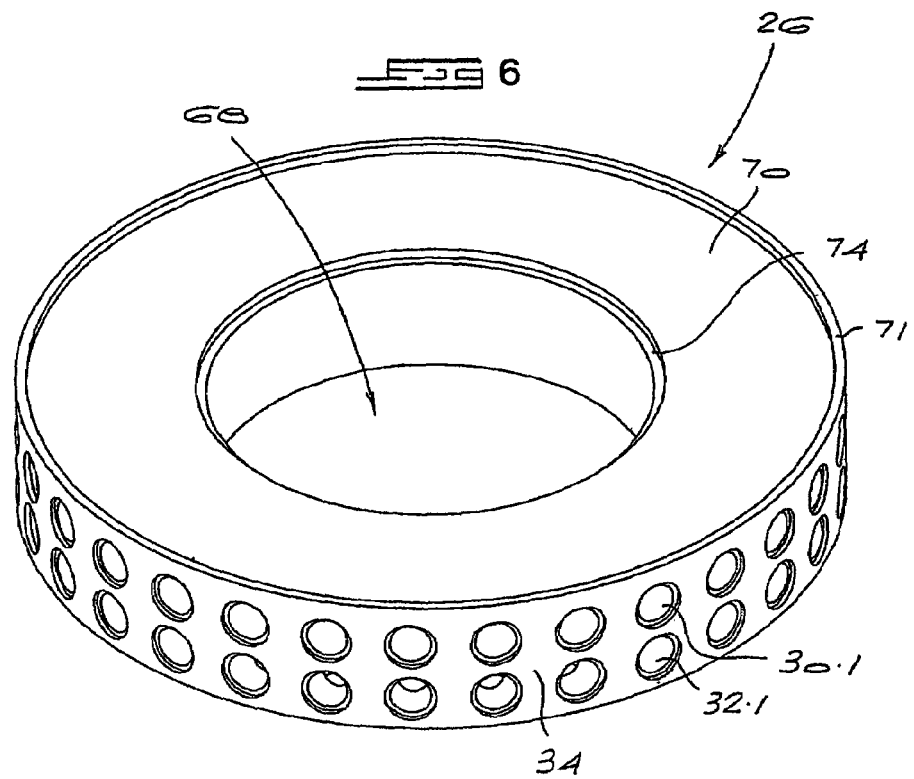

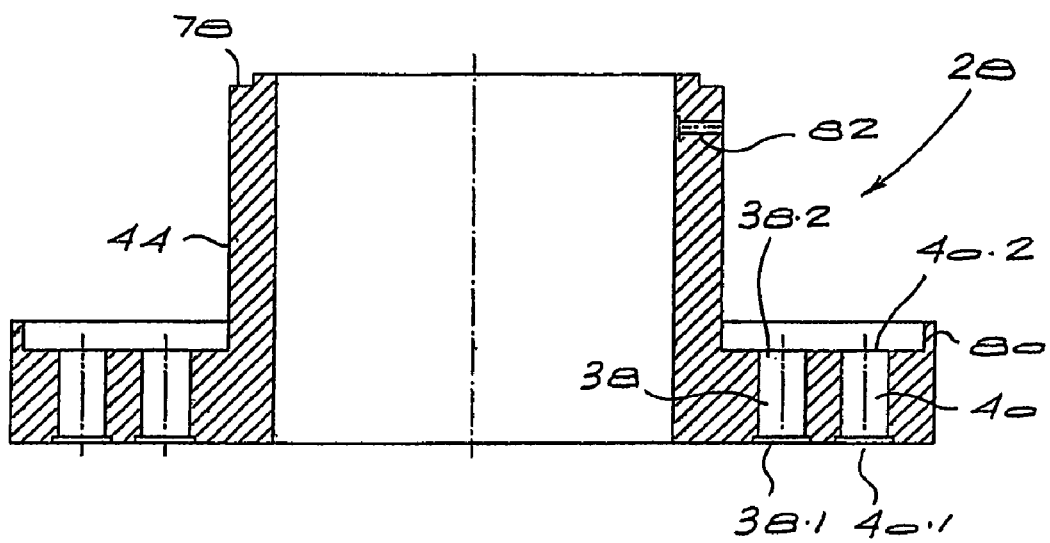
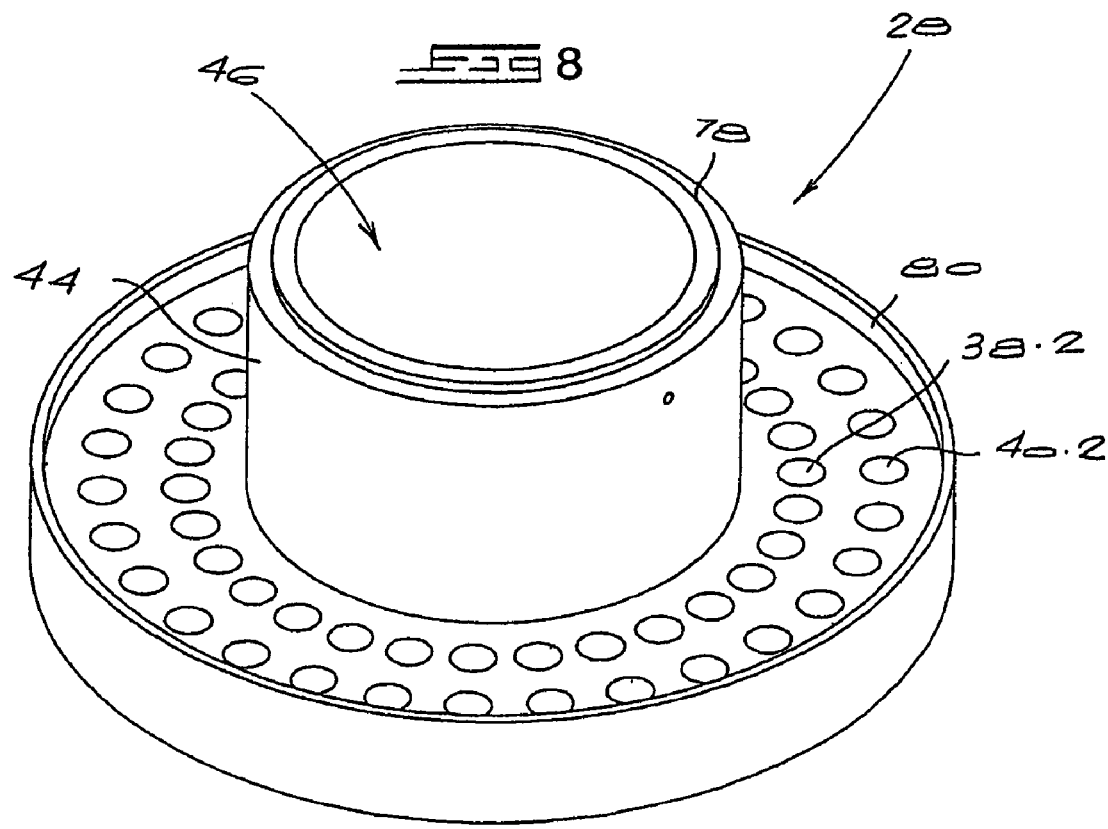

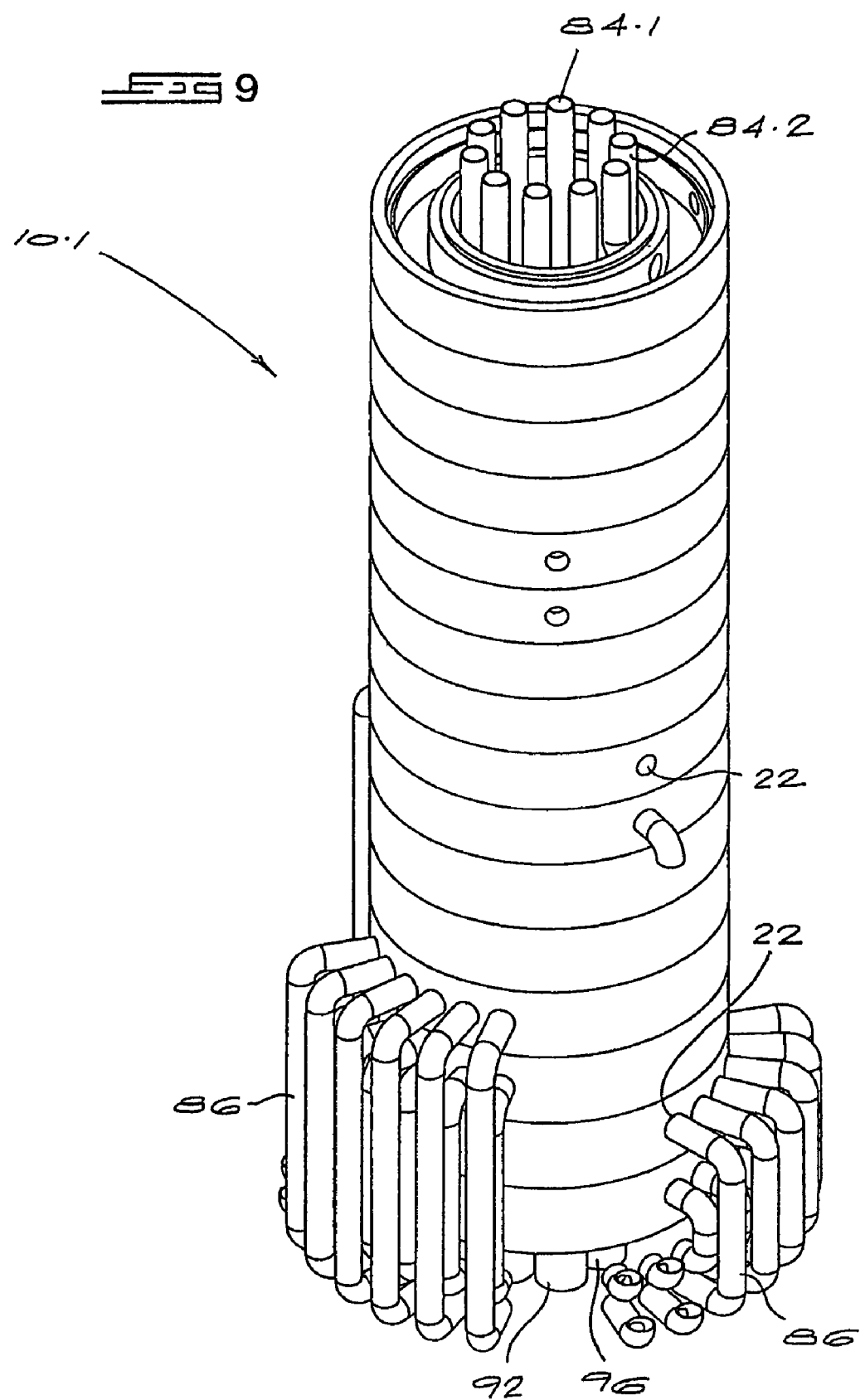

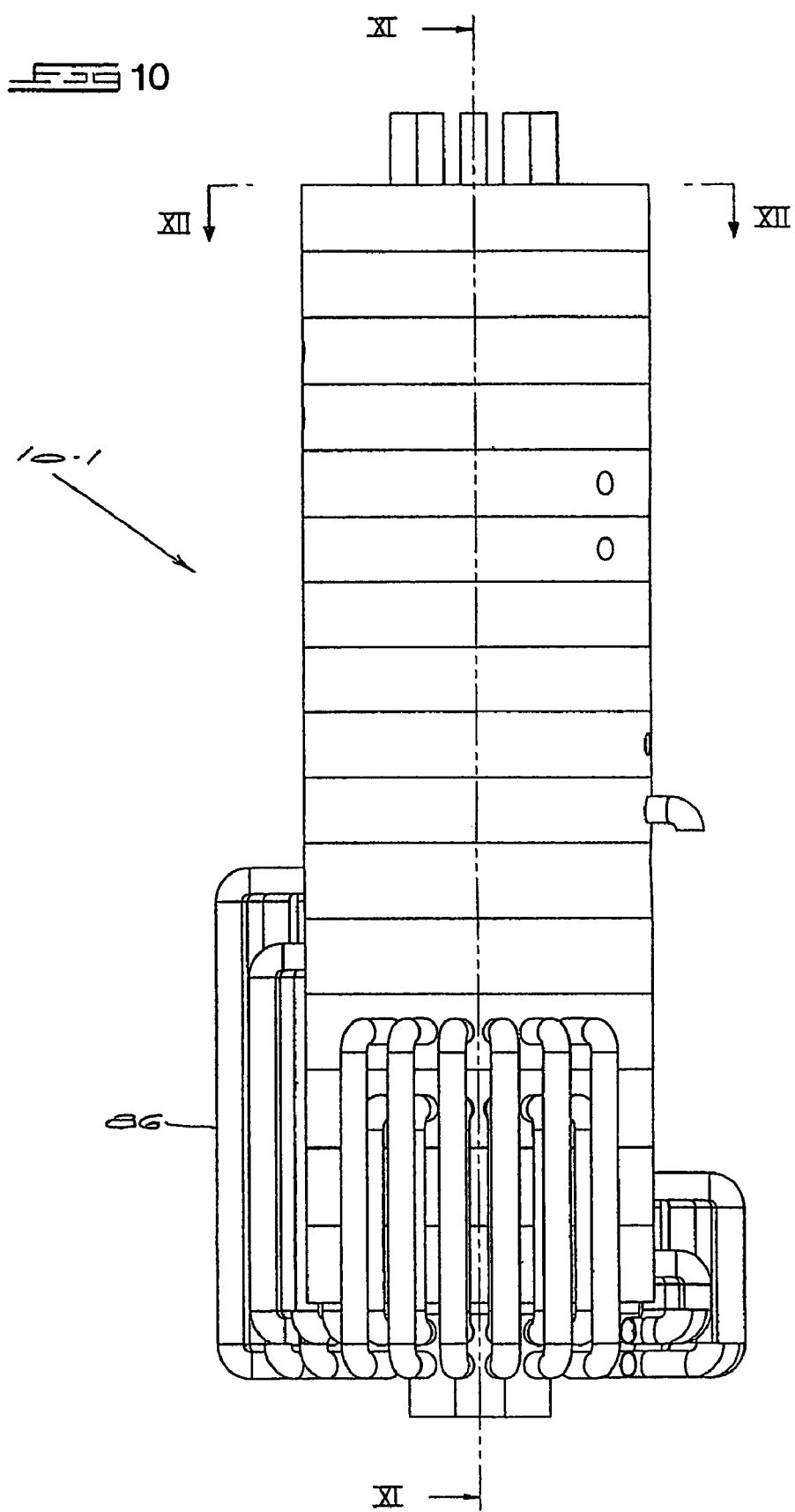

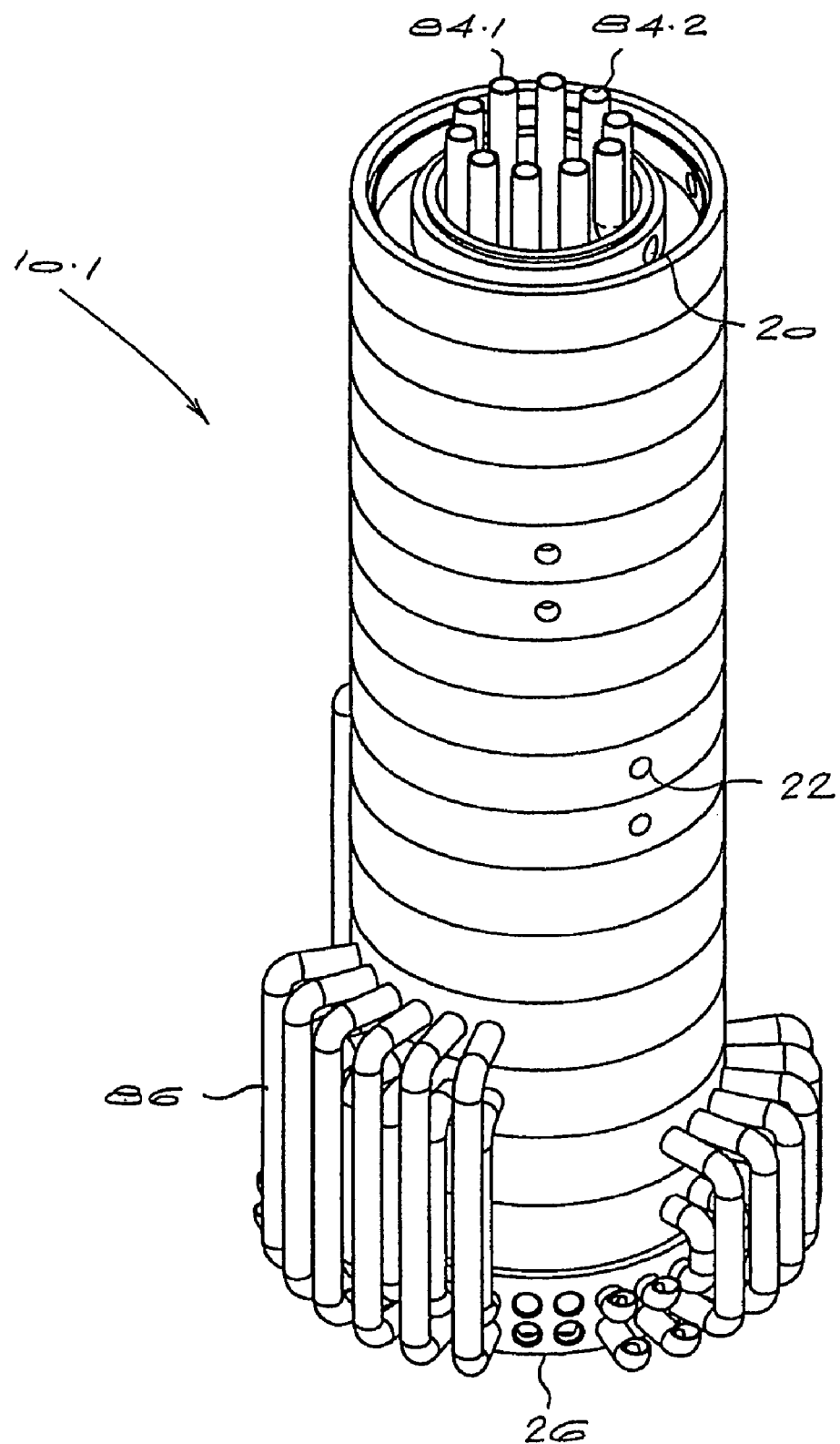

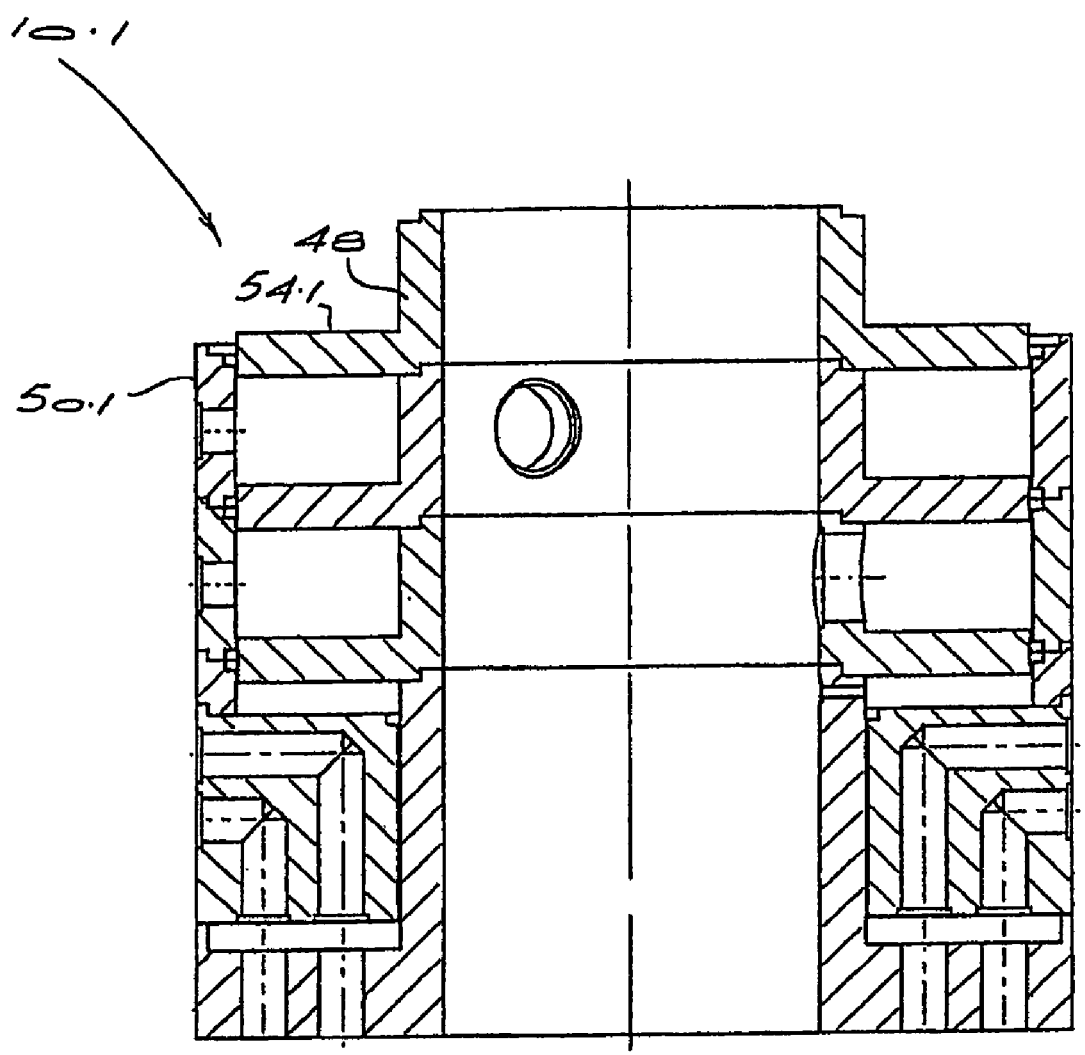

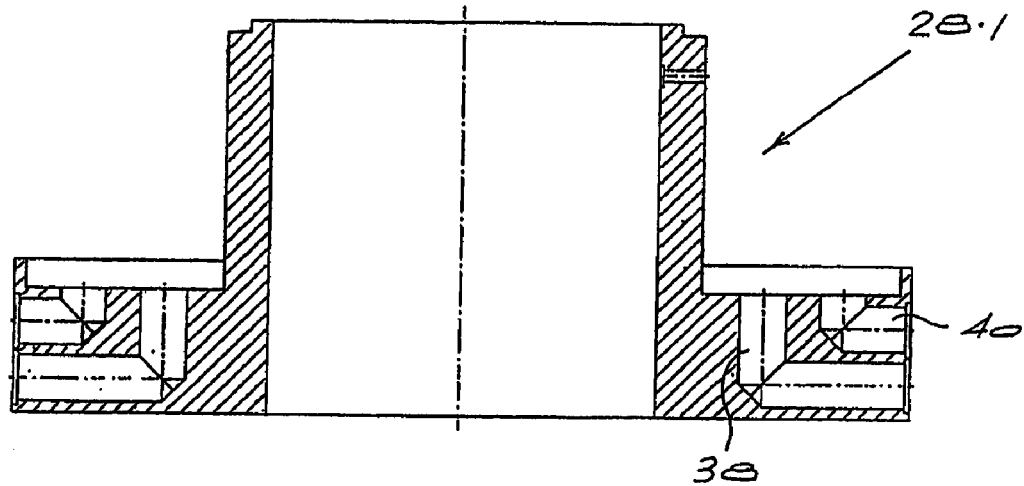
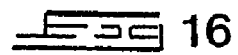
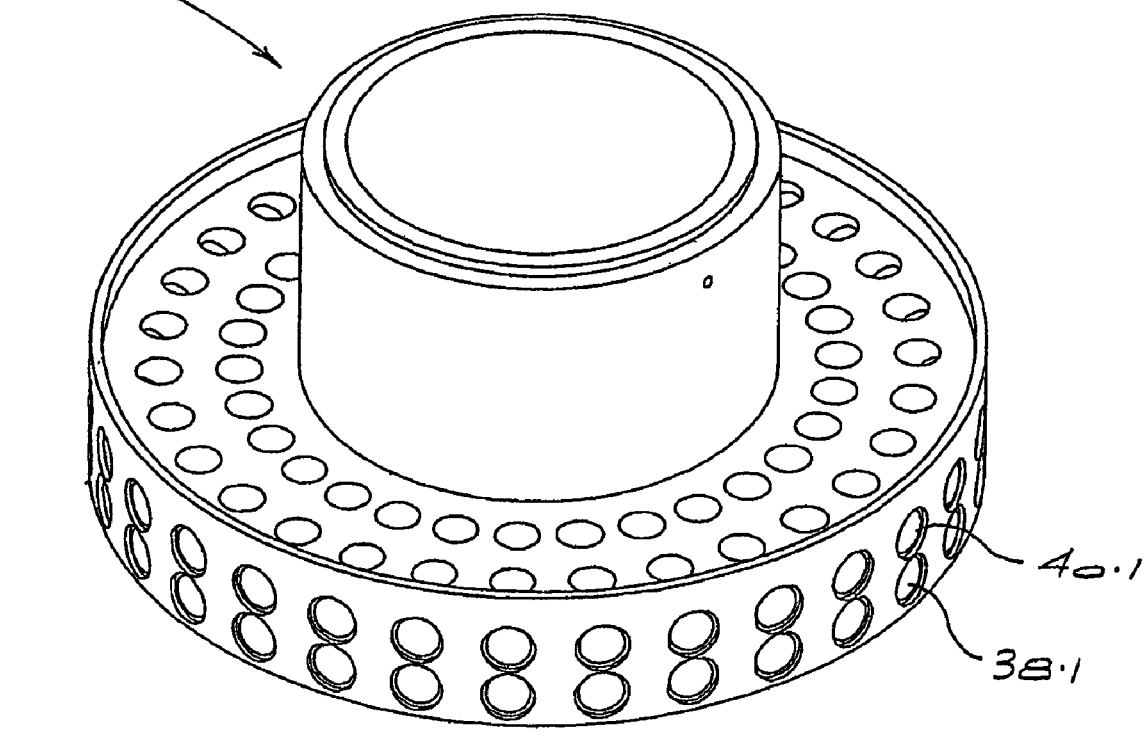

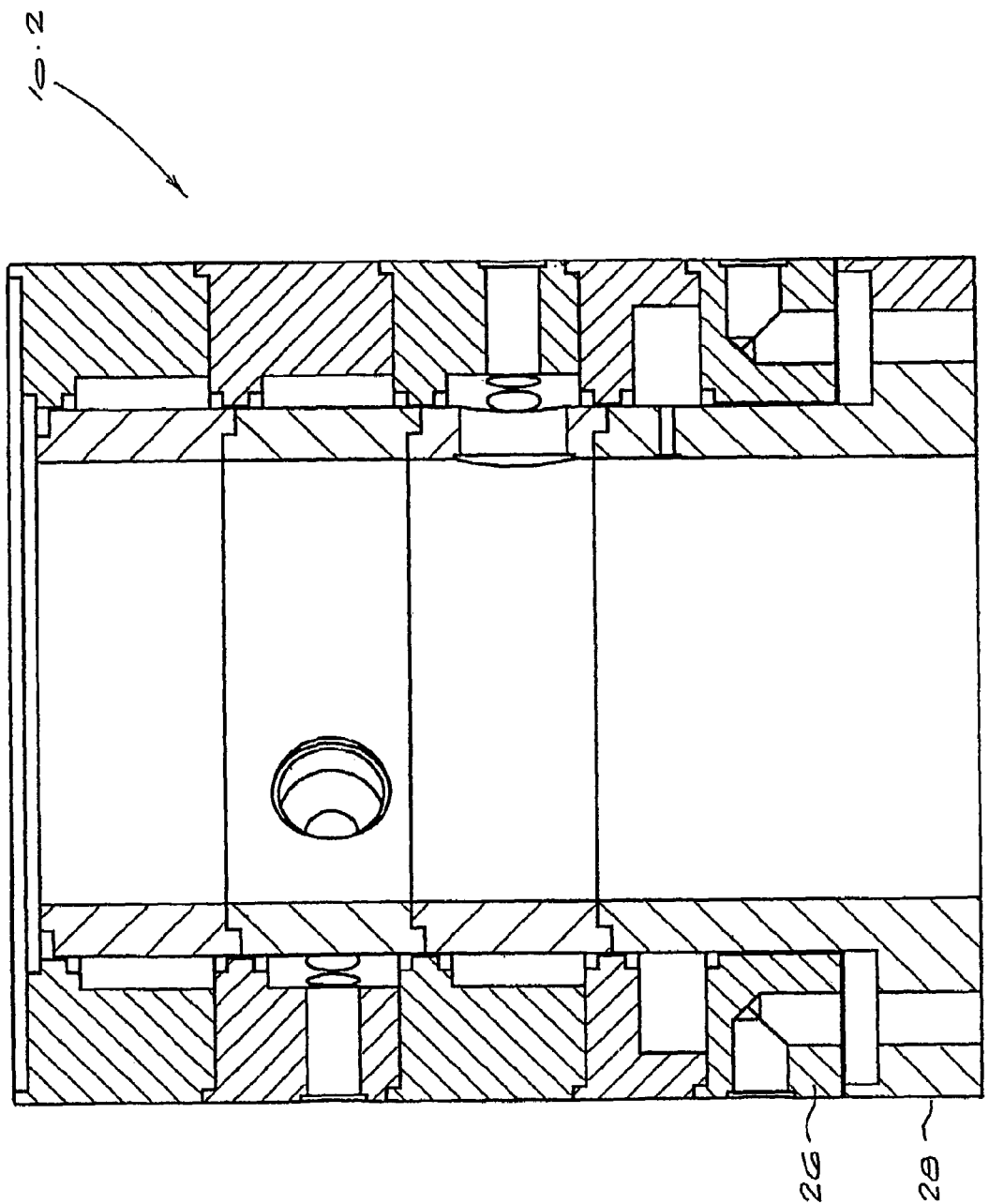

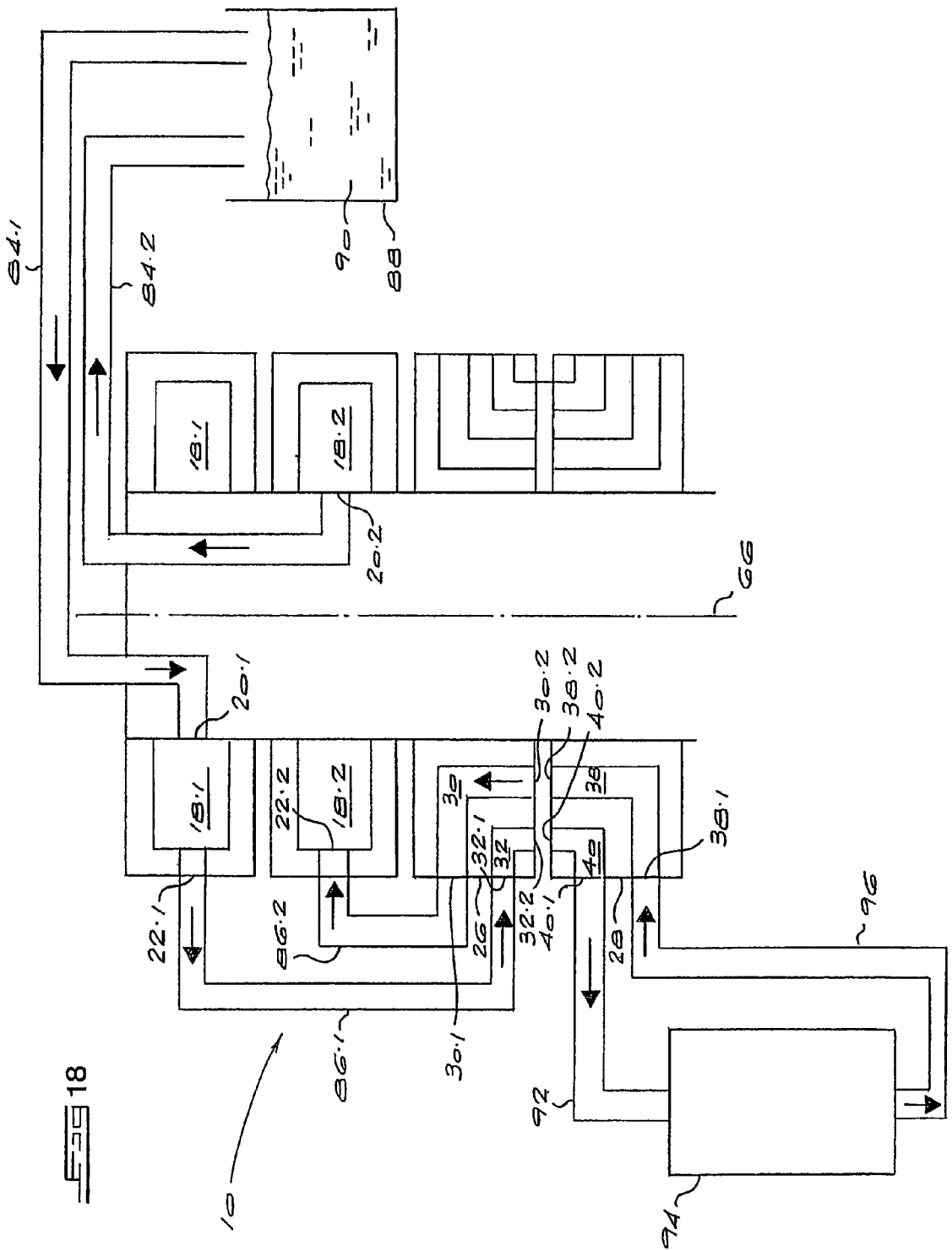

ROTARY DISTRIBUTION APPARATUS

FIELD OF THE INVENTION

This invention relates to a rotary distribution apparatus.

BACKGROUND TO THE INVENTION

In many processes it is necessary sequentially to connect different feed conduits and discharge conduits to process chambers or equipment. The standard approach is to use a plurality of conduits and valves to achieve the desired fluid distribution between the various chambers. However, as the number of feed and discharge conduits and/or the number of process chambers are increased, the use of conventional piping and valves becomes very cumbersome. Although the number of valves may be reduced through the use of multi-port valves at each process chamber, the complexities of the piping arrangement remain.

An alternative method is to mount the process chambers on a rotating carousel, and to use a rotary distribution device sequentially to connect the different feed conduits and discharge conduits to the process chambers. Although this method has significant advantages, and is widely used in the ion-exchange field, it has the primary disadvantage of requiring all the process chambers to be mounted on a rotating carousel. Rotating carousels are described in U.S. Pat. No. 4,522,726 and U.S. Pat. No. 5,676,824.

An alternative approach is to use a rotary distribution apparatus where the feed conduits, the discharge conduits, and the process chambers remain stationary. However in practice, for various reasons, these rotary distribution valves are not widely used.

U.S. Pat. No. 3,192,954 to Gerhold et al describes a rotary distribution valve. This valve comprises a cylindrical valve casing with a plurality of ports extending through the casing. A cylindrical rod-shaped plug is rotatable within the casing. Circular grooves are located in the casing or in the plug. A conduit communicates with each of the circular grooves and extends through the wall of the casing to the exterior of the casing. Recesses, corresponding in number with the circular grooves, are circumferentially spaced around the plug. The ports are spaced around the periphery of the casing so that each of the ports is in communication with each of the recesses at some point in the rotation of the plug. Passageways, corresponding in number with the circular grooves, extend through the plug. Each passageway continuously connects one of the recesses in the plug with one of the circular grooves.

U.S. Pat. No. 4,625,763 to Schick et al describes a disc-axial multiport valve which comprises a fixed stator assembly to which process fluid conduits are connected. A rotor is rotatably mounted within the fixed stator. A fixed distributor is connected to the fixed stator. Process chambers are connected to the fixed distributor. The process chambers are sequentially supplied with process fluid as the rotor is rotated within the fixed stator.

U.S. Pat. No. 5,478,475 to Morita et al describes a fluid distribution apparatus consisting of an upper fluid distributor and a lower fluid distributor with a plurality of processing chambers held and fixed between the upper and lower fluid distributors. This apparatus suffers from the disadvantages that it requires two distributors and it is difficult to fabricate, particularly because of the complex shape of some of the passageways. The rotary valve has internal passages, which means that the size of the valve increases as the number of process vessels connected to it increases. Furthermore, if the process configuration of the process vessels is changed, it may be necessary to change the passageways in the distributors. Thus the apparatus cannot easily be adapted to accommodate a different process configuration.

SUMMARY OF THE INVENTION

According to the invention a rotary distribution apparatus includes:

a fixed inner distribution member with an inner conduit zone;

a rotatable outer distribution member rotatable about the fixed inner distribution member;

a plurality of fluid distribution chambers located between the fixed inner distribution member and the rotatable outer distribution member;

each fluid distribution chamber having a fixed port in the fixed inner distribution member to which a fixed supply or return conduit for a fluid can in use be connected, and at least one distribution port in the rotatable outer distribution member;

at least one indexing arrangement including a rotatable indexing member and a fixed indexing member;

a plurality of passageways extending through each of the rotatable and fixed indexing members, the plurality of passageways each having indexing ports and connection ports with the indexing ports being provided in an indexing surface; and the connection ports of the rotatable indexing member in use being connected to the distribution ports of the distribution chambers by connecting conduits, and the connection ports of the fixed indexing member in use being connected to process chambers by fixed conduits;

so that, in use, when the rotatable outer distribution member, the rotatable indexing member and the connecting conduits are rotated, fluid fed to a fluid distribution chamber is sequentially fed to the process chambers and returned from the process chambers to other fluid distribution chambers as the indexing ports of the rotatable indexing member index relative to the indexing ports of the fixed indexing member.

In the preferred form of the invention the fixed inner distribution member is fixed to the fixed indexing member, and the rotatable outer distribution member is fixed to the rotatable indexing member, with the rotatable outer distribution member and the rotatable indexing member being rotatable about a common axis.

Each indexing member preferably has two concentric rings of passageways defining a plurality of pairs of passageways, with each pair of passageways consisting of a supply passageway and a return passageway. In an alternative form of the invention, each indexing member has a single ring of passageways. In this alternative form of the invention two indexing arrangements located one at either end of the distribution members may be provided.

A pressure chamber housing for a pressure chamber may be provided so that in use the pressure of fluid in the pressure chamber maintains the indexing surface of the rotatable indexing member in contact with the indexing surface of the fixed indexing member.

The pressure chamber is preferably located between the rotatable indexing member and the rotatable outer distribution member, and the pressure chamber housing is preferably rotatable about a common axis together with the rotatable indexing member and the rotatable outer distribution member.

The indexing surface of the fixed indexing member may be the surface of an indexing plate.

The fluid distribution chambers preferably extend circumferentially around the fixed inner distribution member. Preferably at least two fluid supply distribution chambers and at least one fluid return distribution chamber are provided.

Seals are preferably provided between the fixed inner distribution member and the rotatable outer distribution member to seal the fluid distribution chambers from one another. The seals are preferably fixed to and rotatable with the rotatable outer distribution member.

Means for rotating the rotatable outer distribution member and for rotating the rotatable indexing member may be provided. The means for rotating may include a ratcheting arrangement operated by a piston and cylinder arrangement. In another embodiment of the invention the means for rotating may include a ring gear fixed directly to the rotatable outer distribution member or to the rotatable indexing member, and a motor for rotating the ring gear.

In one embodiment of the invention a single fluid distribution chamber is connected to a plurality of connection ports in the rotatable indexing member so that a specific supply fluid in a supply conduit can be distributed to a plurality of process chambers.

In another embodiment of the invention a connection port of the rotatable indexing member can be connected to a plurality of different fluid distribution chambers so that different fluids can be mixed before entering the rotatable indexing member, or so that mixing of different fluids exiting a single rotatable indexing port can be prevented. The connection may be by way of a flow control valve or a multiport valve such as a three-way valve.

The inner conduit zone of the fixed inner distribution member may comprise a hollow core into which conduits can extend. Alternatively, the inner conduit zone may comprise the core of the fixed inner distribution member within which conduits are formed.

The term indexing includes within its meaning continuous rotation and interrupted rotation.

BRIEF DESCRIPTION OF THE DRAWINGS

FIG. 5 is a cross-sectional side view of a rotatable indexing member of the apparatus of FIGS. 1 and 2;

FIG. 6 is a perspective view of the rotatable indexing member of FIG. 5;

FIG. 7 is a cross-sectional side view of a fixed indexing member of the apparatus of FIGS. 1 and 2;

FIG. 8 is a perspective view of the fixed indexing member of FIG. 7;

FIG. 9 is a perspective view of an apparatus according to another embodiment of the invention, excluding the indexing members but including numerous fluid distribution chambers;

FIG. 10 is a side view of FIG. 9;

FIG. 13 is a perspective view similar to that of FIG. 9 but including the rotatable indexing member;

FIG. 14 is a cross-sectional side view of part of the apparatus shown in FIGS. 9 to 13;

FIG. 15 is a cross-sectional side view of an alternative embodiment of the fixed indexing member;

FIG. 16 is a perspective view of the fixed indexing member of FIG. 15;

FIG. 17 is a cross-sectional side view of a yet further embodiment of the apparatus;

FIG. 18 is a flow diagram incorporating the apparatus to illustrate the operation of the rotary distribution apparatus;

DETAILED DESCRIPTION OF THE DRAWINGS

Figure 1:
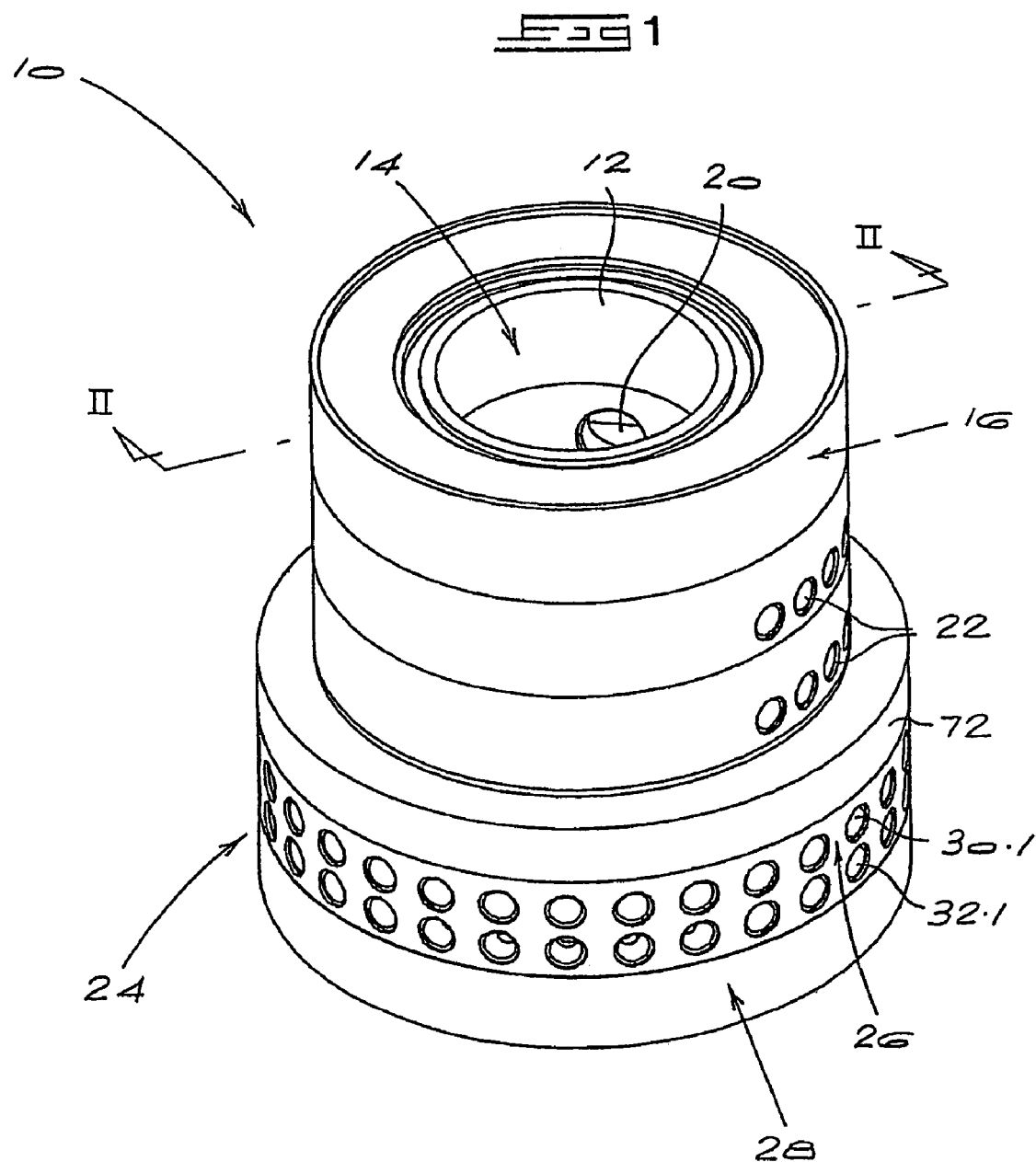
FIG. 1 is a perspective view of a rotary distribution apparatus according to the invention.

Referring firstly to FIGS. 1 to 8, a rotary distribution apparatus 10 includes a fixed inner distribution member 12 with a conduit receiving core 14. A rotatable outer distribution member 16 surrounds the fixed inner distribution member 12. The rotatable outer distribution member 16 is rotatable outer about the fixed inner distribution member 12.

Fluid distribution chambers 18 are located between the fixed inner distribution member 12 and the rotatable outer distribution member 16.

Each fluid distribution chamber 18 has a fixed port 20 in the fixed inner distribution member 12 and a plurality of distribution ports 22 in the rotatable outer distribution member 16. It will be appreciated that a plurality of fixed ports 20 and a single distribution port 22 may be provided in certain instances.

An indexing arrangement 24 for the fluid distribution chambers 18 consists of a rotatable indexing member 26 and a fixed indexing member 28.

The rotatable indexing member 26 has pairs of passageways 30 and 32 extending through it. The passageways 30 and 32 have connection ports 30.1 and 32.1 in an outer surface 34 of the rotatable indexing member 26, and indexing ports 30.2 and 32.2 in an indexing surface 36 of the rotatable indexing member 26.

The fixed indexing member 28 has pairs of passageways 38 and 40 extending through it and through an indexing plate 42. The indexing plate 42 is fixed to the fixed indexing member 28. The passageways 38 and 40 have connection ports 38.1 and 40.1 for connection to process chambers (not shown), and indexing ports 38.2 and 40.2 in the indexing plate 42 for indexing with the indexing ports 30.2 and 32.2 of the rotatable indexing member 26.

The fixed inner distribution member 12 is fixed to the fixed indexing member 28 by virtue of circular cylindrical extension member 44 which has a bore 14.1. The bore 14.1 is continuous with the bore 14 of the fixed inner distribution member 12.

Figure 2:
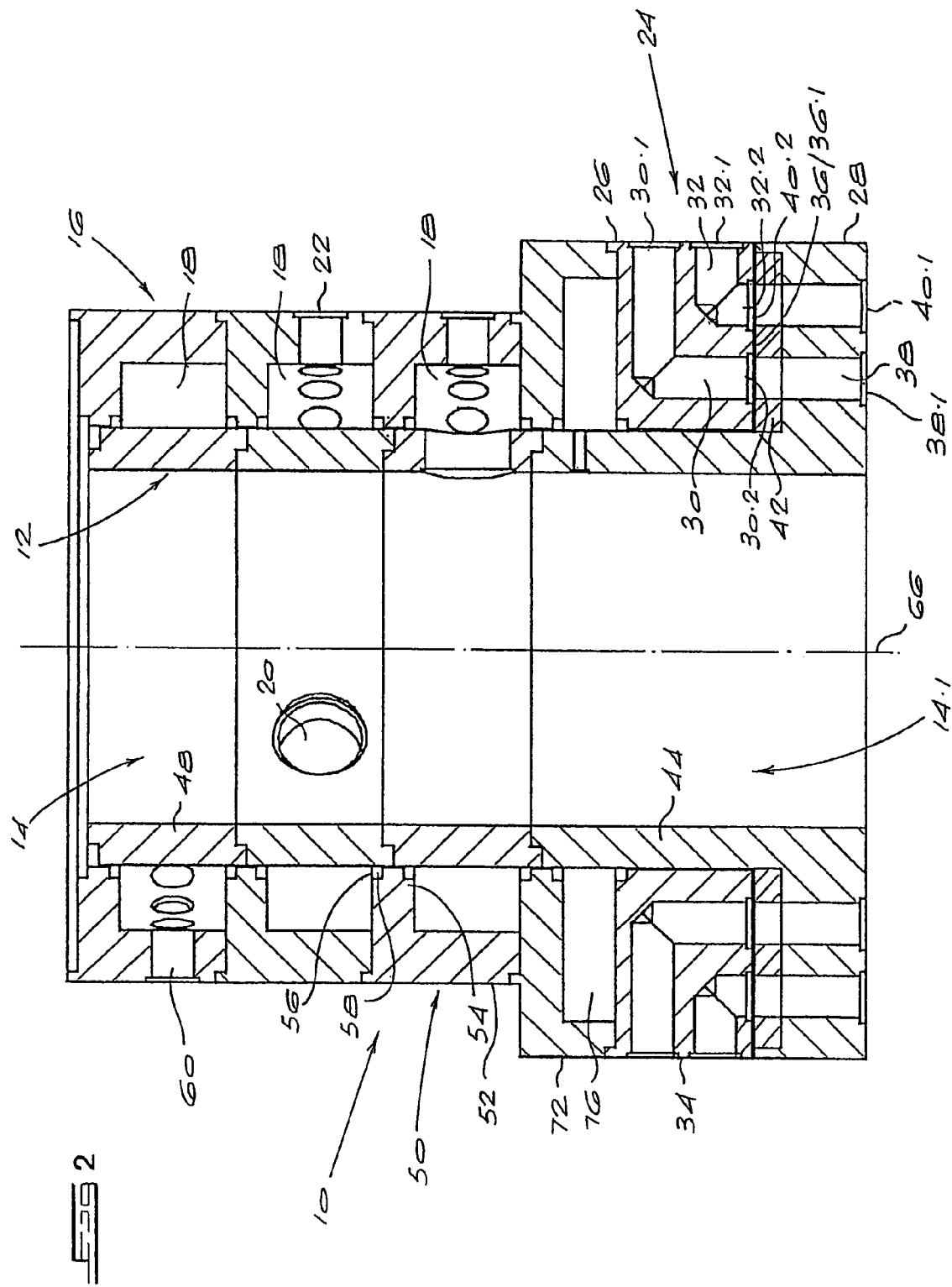
FIG. 2 is a cross-sectional side view on line II—II of FIG. 1.

As can be seen from FIG. 2, the fixed inner distribution member 12 is right circular cylindrical and consists of identical inter-engaging fixed segments 48, each of which forms an inner fixed sidewall of a fluid distribution chamber 18.

As can also be seen from FIG. 2, the rotatable outer distribution member 16 consists of inter-engaging rotatable segments 50, each of which has an outer section 52 and an inwardly extending seal receiving section 54. The outer section 52 forms an outer rotatable sidewall of a fluid distribution chamber 18. The inwardly extending seal receiving section 54 forms one of the ends of a fluid distribution chamber 18, and has recesses 56 for a pair of circular cylindrical seals 58 which seal adjacent fluid distribution chambers 18 from one another and from the bore 14 of the inner fixed distribution member 12.

Figure 3:
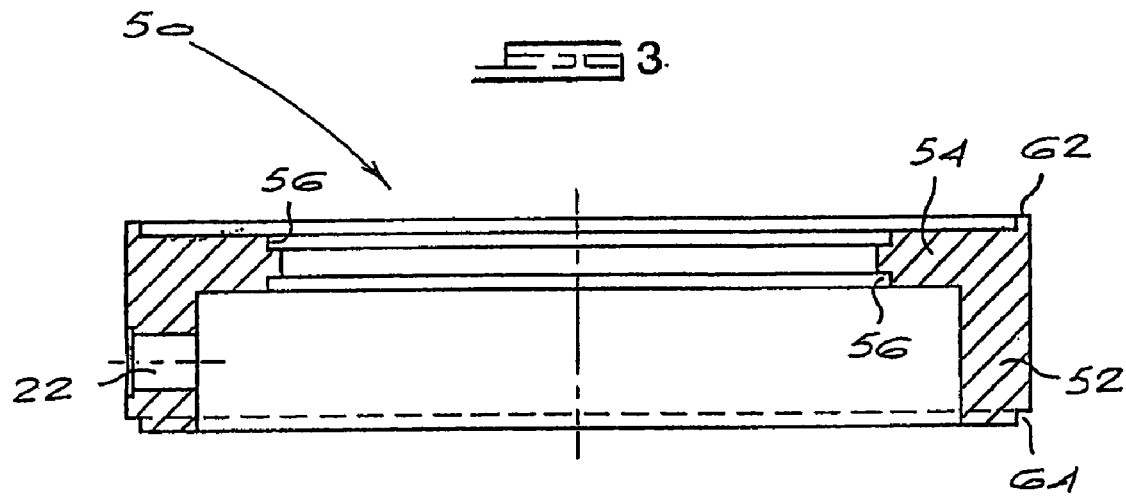
FIG. 3 is a cross-sectional side view of an outer distribution member of the apparatus of FIGS. 1 and 2.
Figure 4:
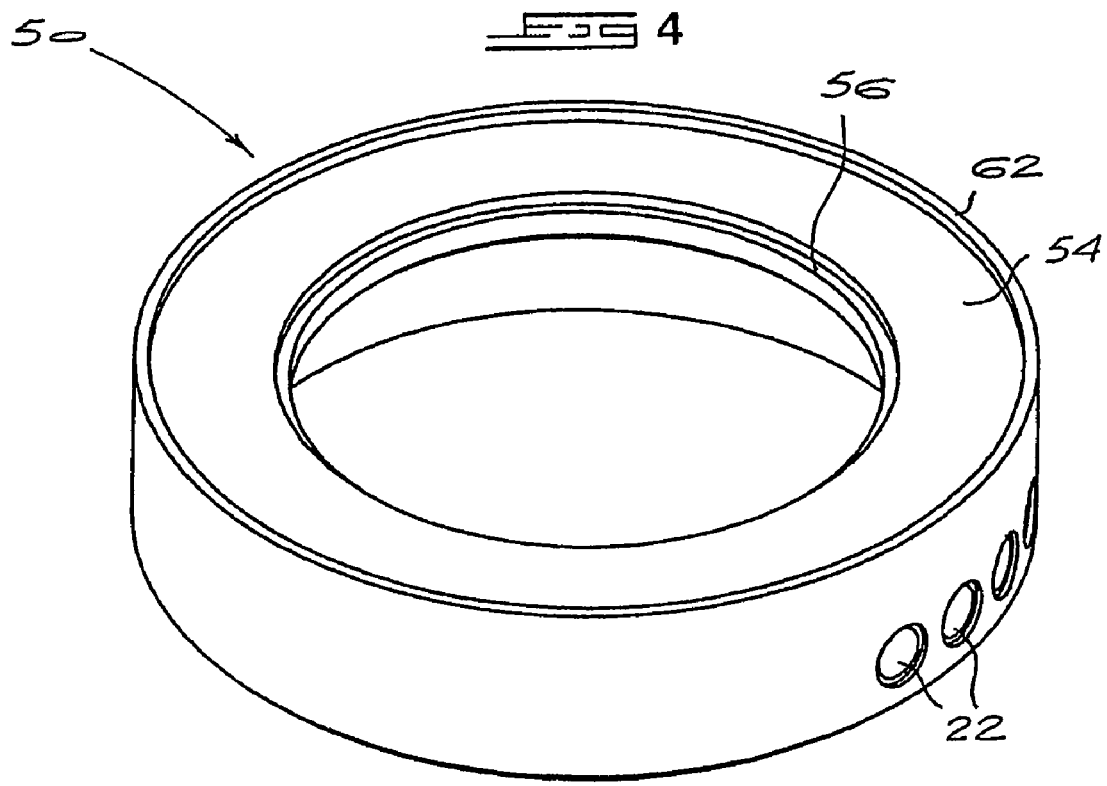
FIG. 4 is a perspective view of the outer distribution member of FIG. 3.
Figure 11:
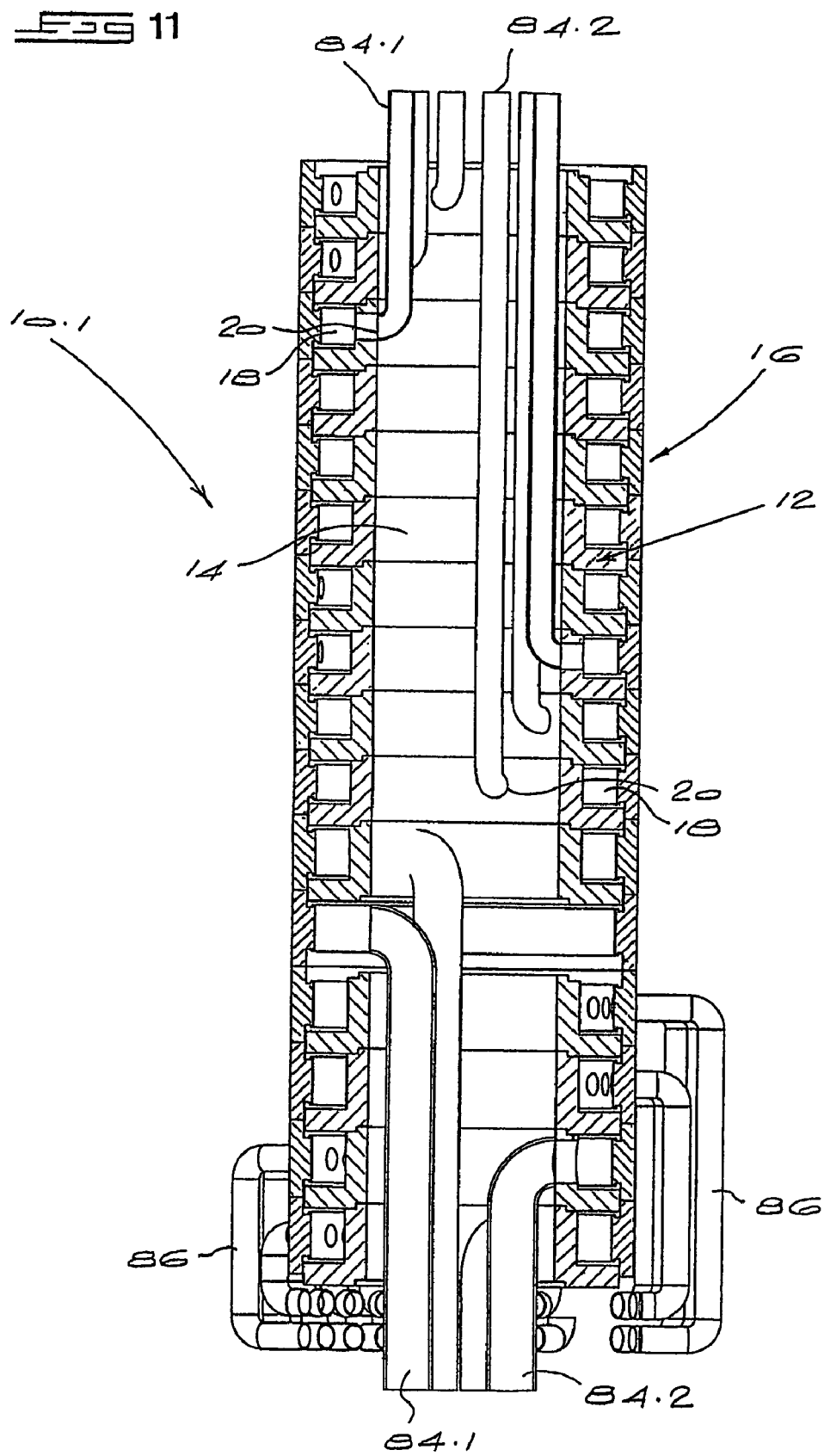
FIG. 11 is a cross-sectional side view on line XI—XI of FIG. 10.
Figure 12:
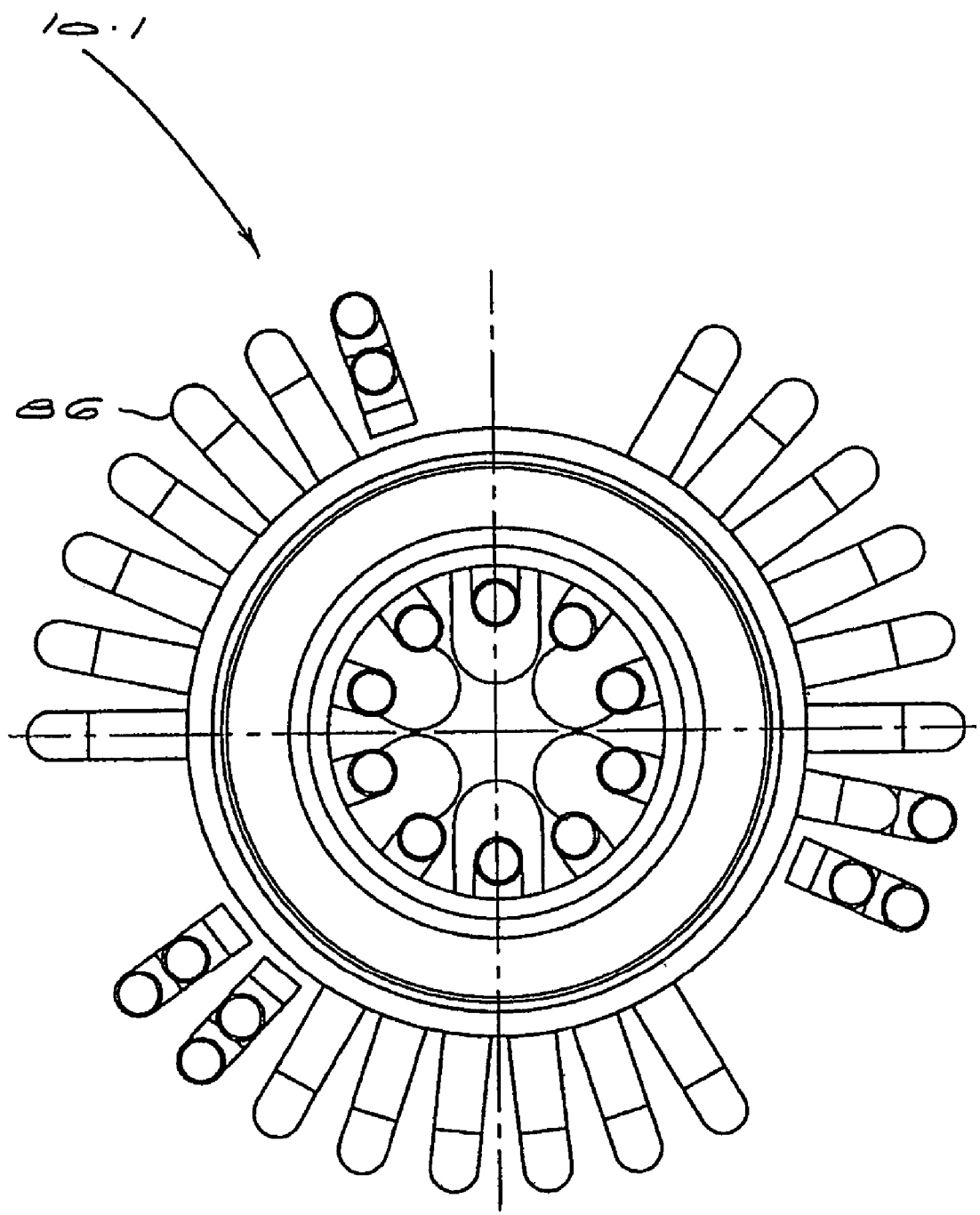
FIG. 12 is a plan view on line XII—XII of FIG. 10.

Referring now to FIGS. 3 and 4, one of the rotatable segments 50 is shown in more detail. The outer section 52 has circumferentially spaced distribution ports 22, a circumferentially extending lip 62 at one of its ends and a circumferentially extending step 64 at the other of its ends. As can be seen from FIG. 2, the lip 62 of a rotatable segment 50 engages within a step 64 of an adjacent rotatable segment 50. Although not shown, the rotatable segments 50 are secured to one another, or all together, by bolts and sealed from one another by seals. The fixed segments 48 are also bolted to one another, or all together, and sealed from one another by seals.

As can be seen from FIG. 2, the rotatable outer distribution member 16, consisting of the segments 50 stacked one on top of the other, can rotate about a longitudinal axis 66 of the fixed inner distribution member 12, which fixed inner distribution member 12 consists of segments 48 stacked one on top of the other.

Referring now to FIGS. 2, 5 and 6, the rotatable indexing member 26 is an annular disc with a bore 68 through which the extension member 44 of the fixed indexing member 28 extends, and about which extension member 44 the rotatable indexing member 26 is rotatable. The rotatable indexing member 26 has a pressure chamber surface 70. The pressure chamber surface 70 has a circumferentially extending lip 71 for inter-engagement with a pressure housing 72. A seal receiving step 74 is provided in the bore 68 for a seal for a pressure chamber 76. In use, the pressure of a fluid, which could be air or nitrogen for example, in the pressure chamber 76 maintains the indexing surface 36 of the rotatable indexing member 26 in contact with an indexing surface 36.1 of the fixed indexing member 28.

Although not shown, the pressure chamber housing 72 and the rotatable indexing member 26 are secured together by bolts and sealed from one another. The pressure housing 72 is bolted to the rotatable outer distribution member 16. Thus the rotatable indexing member 26, the rotatable pressure housing 72 and the rotatable outer distribution member 16 are all bolted to one another and are all rotatable about a common axis, being the longitudinal axis 66.

Referring now to FIGS. 2, 7 and 8, the fixed indexing member 28 has a circumferentially extending step 78 for inter-engagement with an adjacent fixed segment 48 of the fixed inner distribution member 12. A circumferentially extending lip 80 is provided for locating the indexing plate 42 (which has been removed for the sake of clarity) in position between the extension member 44 and the lip 80. A passageway 82 extends through the extension member 44 for connecting a fixed pressurised air conduit (not shown), extending into the bore 46, to the pressure chamber 76. As can be seen from FIGS. 7 and 8, numerous pairs of passageways 38 and 40 are provided in radially spaced relationship in the fixed indexing member 28.

Referring now to FIGS. 9 to 13 in which like parts are referred to by the same numbers as like parts of FIGS. 1 and 2, a rotary distribution apparatus 10.1 has fixed supply and return conduits 84.1 and 84.2 extending into the bore 14 of the fixed inner distribution member 12, and fixed supply and return conduits 84.1 and 84.2 extending into the bore 14.1 of the fixed indexing member 28. The fixed supply and return conduits 84.1 and 84.2 are connected to fixed ports 20 of the distribution chambers 18. If a supply conduit 84.1 is connected to a fixed port 20 of a distribution chamber 18, that chamber is referred to herein as a supply chamber 18. If a return conduit 84.2 is connected to a fixed port 20 of a distribution chamber 18, that distribution chamber is referred to herein as a return chamber 18. Generally a plurality of supply and return chambers 18 are provided. Each chamber 18 may have more than one supply or return conduit if fluid flow rates require it to be so. However, generally only one supply or return conduit will be connected to a fixed port 20 of a particular fluid distribution chamber 18.

One or more of the distribution ports 22 of a fluid distribution chamber 18 are connected by external conduits in the form of pipes 86 to connections ports 30.1 or 32.1 of the rotatable indexing member 26. The external pipes 86 rotate together with the rotatable outer distribution member 16 and the rotatable indexing member 26 about the longitudinal axis 66.

The passageways 30 and 32 in the rotatable indexing member 26 consist of a supply passageway 30 and a return passageway 32. Thus a supply chamber 18 for a particular supply fluid is connected by the external pipes 86 to supply passageways 30, and corresponding return passageways 32 are connected to a return chamber 18 for that particular supply fluid by other external pipes 86.

In FIGS. 9 to 12, the rotatable indexing member 26 and the fixed indexing member 28 are omitted for the sake of clarity. However FIG. 13 includes the rotatable indexing member 26. In FIGS. 9 to 13, the external pipes 86 are shown extending from some of the fluid distribution chambers 18 only, again for the sake of clarity. As can be seen from FIG. 13, numerous external pipes 86 are connected to a single fluid distribution chamber 18.

Referring now to FIG. 14, the rotary distribution apparatus 10.1 is similar to the apparatus 10, except that segments 48 of the fixed distribution member 12 include outwardly extending sections 54.1 and the segments 50.1 of the rotatable distribution member 16 are linear. The apparatus 10.1 suffers from the disadvantage that larger diameter seals are required between the sections 54.1 and the segments 50.1.

Referring now to FIGS. 15 and 16, a fixed indexing member 28.1 is similar to the fixed indexing member 28 except that the passageways 38 and 40 have ports 38.1 and 40.1 in the side of the fixed indexing member 28.1, and each passageway has a right angled bend within it.

Referring now to FIG. 17, a rotary distribution apparatus 10.2 is similar to the apparatus 10 except that indexing members 26 and 28 each have a single row of passageways.

Referring now to FIG. 18, a fluid supply tank 88 containing a particular process fluid 90 is connected by a fixed supply conduit 84.1 to a fixed supply port 20.1 of a fluid supply chamber 18.1. A supply distribution port 22.1 of the supply chamber 18.1 is connected via an external conduit 86.1 to a supply connection port 32.1 in the rotatable indexing member 26. Supply fluid flows through a supply passageway 32 to the supply indexing port 32.2 and into the indexing port 40.2 of the fixed indexing member 28. From there the supply fluid flows through a supply passage 40 and out a supply connection port 40.1 into a fixed supply conduit 92 connected to a process chamber or vessel 94. The fluid flows through the process chamber 94 and exits the process chamber 94 as return fluid into a fixed return conduit 96. The return fluid flows through the fixed return conduit 96 into a return connection port 38.1 of the fixed indexing member 28. The return fluid then flows through a return passageway 38 and out a return indexing port 38.2 of the fixed indexing member 28 and into a return indexing port 30.2 of the rotatable indexing member 26. The return fluid then flows through a return passageway 30 and out a return connection port 30.1 of the rotatable indexing member 26, into a return external conduit 86.2. The return fluid then enters the return chamber 18.2 via a return port 22.2. The return fluid exits the return chamber 18.2 through a fixed return port 20.2 and flows into a fixed return conduit 84.2 and is returned to the fluid supply tank 90. This example merely illustrates a typical flow path through the rotary distribution apparatus. In practice the return fluid would be returned to a separate tank or discharged to waste.

It will be appreciated that different supply chambers 18.1 may have a common return chamber 18.2. Depending on the nature of the supply process fluid, its return fluid may return to waste and not to the fixed supply tank 90. For the sake of clarity in FIG. 18, only one supply chamber and only one return chamber are shown. However it will be appreciated that the apparatus 10 would have at least two supply chambers for at least two different process fluids. The apparatus 10 can connect n-number of different process fluids to m-number of distribution chambers 18. Generally the m-number of distribution chambers 18 is greater than the n-number of process fluids.

Figure 19:
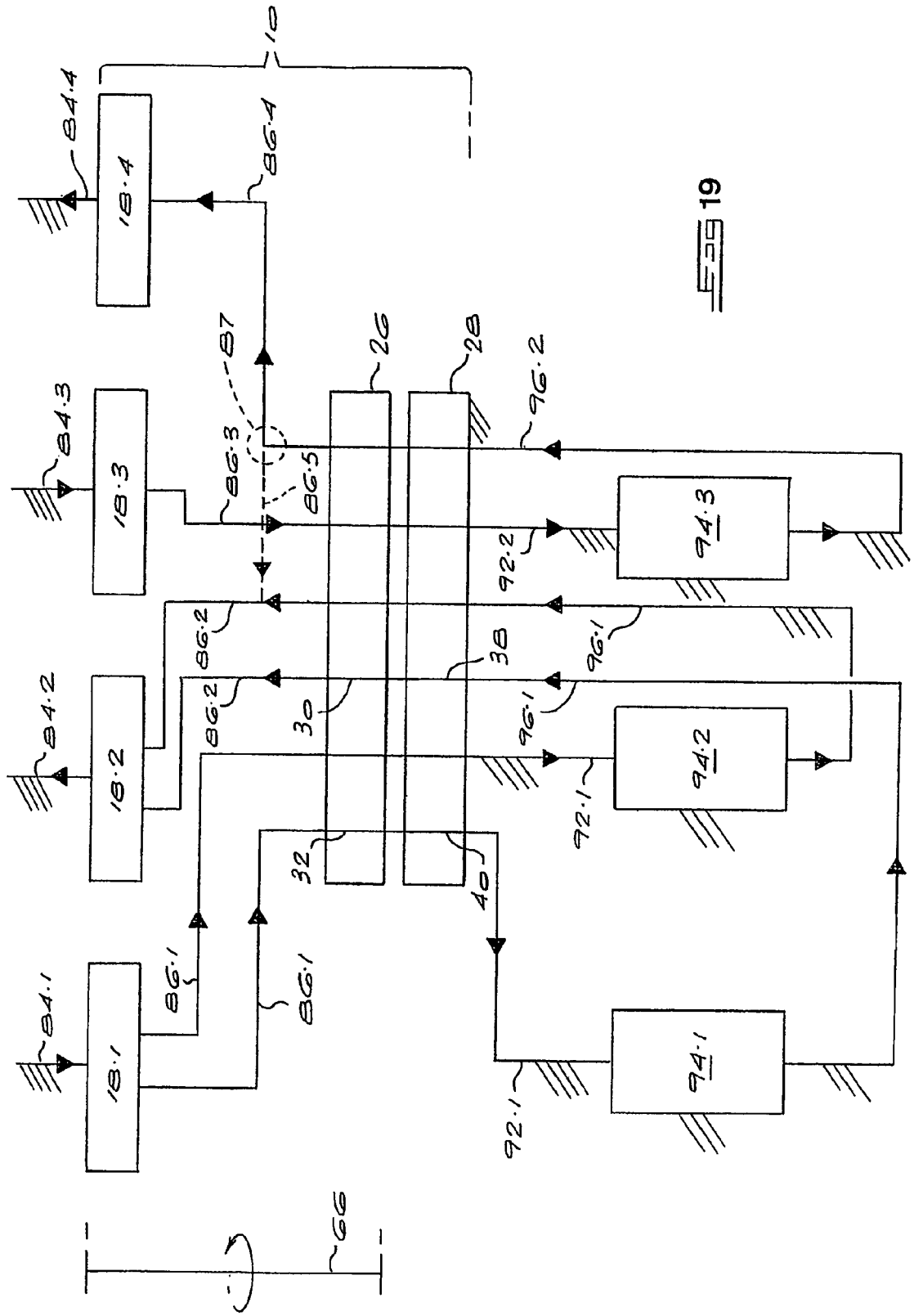
FIG. 19 is a flow diagram of a process incorporating the apparatus to illustrate the operation of the apparatus and in which flow diagram the apparatus is shown in developed form for the sake of clarity.

An example of a process in which the apparatus 10 is used, is that in which sugar juice is decolourised. In such a process a number of process vessels are provided, each containing a resin capable of removing colour molecules from the sugar juice. Periodically the resin in each process vessel needs to be rejuvenated by passing a regenerant chemical over the resin. The flow diagram of FIG. 19 illustrates such a process. For the sake of clarity the water flushing steps before and after regeneration are excluded from the flow diagram. Sugar juice is supplied to supply chamber 18.1 via a fixed supply conduit 84.1. The sugar juice is fed from the supply chamber 18.1 via two external pipes 86.1 to the rotatable indexing member 26, then to the fixed indexing member 28 and then via two fixed conduits 92.1 to two fixed process vessels 94.1 and 94.2. The sugar juice flows through the process vessels 94.1 and 94.2 and is returned to a return chamber 18.2 via two fixed conduits 96.1, the fixed indexing member 28; the rotatable indexing member 26 and a pair of external pipes 86.2. The sugar juice is discharged from the return chamber 18.2 through a fixed conduit 84.2. Simultaneously a regenerant chemical is fed into an regenerant chemical supply chamber 18.3 by a fixed conduit 84.3 and supplied to a fixed process vessel 94.3 to rejuvenate the resin in process vessel 94.3. The regenerant chemical is supplied to the process vessel 94.3 from the regenerant chemical supply chamber 18.3 via an external pipe 86.3, to the rotatable indexing member 26, then into the fixed indexing member 28, and from there via a fixed conduit 92.2 into the process vessel 94.3. The regenerant chemical is returned to a regenerant chemical return chamber 18.4 via a fixed conduit 96.2 to the fixed indexing member 28, then to the rotatable indexing member 26 and from there via an external pipe 86.4 to the regenerant chemical return chamber 18.4. The regenerant chemical is discharged from the regenerant chemical return chamber 18.4 via a fixed conduit 84.4. As the rotatable indexing member 26 is rotated, so the regenerant chemical is sequentially fed to the remaining two process vessels and the sugar juice is simultaneously supplied to the other two process vessels not being supplied with the regenerant chemical. A three-way valve 87 may be provided in the fixed conduit 86.4. The valve 87 is connected to the fixed conduit 86.2 so that whilst sugar juice flows out of the process vessel 94.3 as the sugar juice is displaced in the process vessel 94.3 by the regenerant chemical, the sugar juice will flow into the sugar juice return chamber 18.2 via a rotating by-pass conduit 86.5 instead of flowing into the regenerant chemical return chamber 18.4 where it would be mixed with the regenerant chemical. The three-way valve 86.5 could for example operate on a timer so that it will direct sugar juice through the by-pass conduit 86.5 for the time that it takes for the sugar juice to be displaced from the process vessel 94.3, thereafter the three-way valve switches and directs the regenerant chemical to the regenerant chemical return chamber 18.4 via the remainder of external pipe 86.4. Instead of a timer a fluid sensing device located in the conduit 86.4 may be used. The fluid sensing device can then control the operation of the three-way valve.

In FIG. 19, the common longitudinal axis about which the rotatable components of the apparatus 10 rotate, is shown by line 66, and the fixed components have hatched lines adjacent to them.

Figure 20:
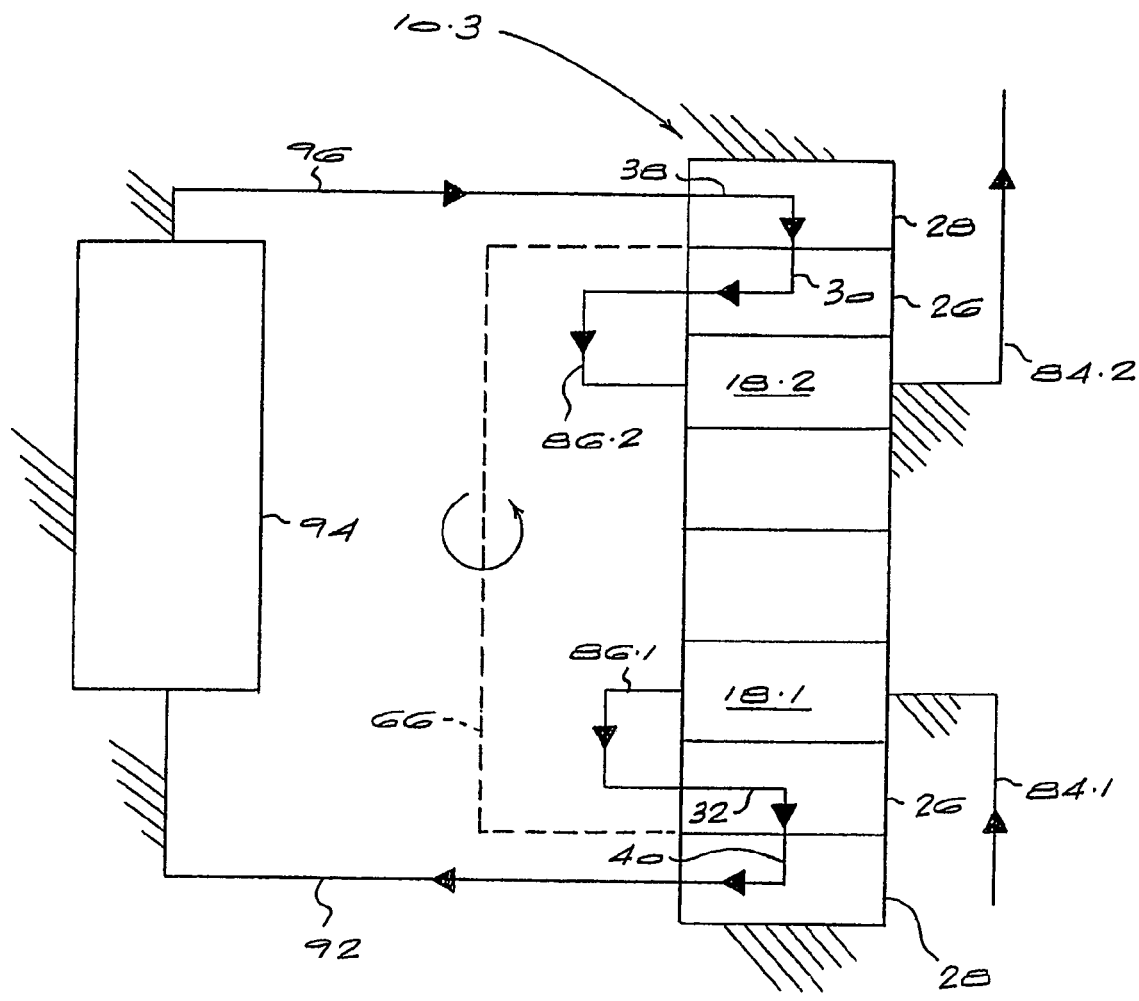
FIG. 20 is a flow diagram incorporating a apparatus according to a further embodiment the invention having two pairs of single passageway indexing members.

Referring now to FIG. 20, a rotary distribution apparatus 10.3 has a lower pair of indexing members 26 and 28 for supplying fluid to a process vessels 94 and an upper pair of indexing members 26 and 28 for returning the fluid from the process vessels 94. For the sake of clarity the same reference numerals are used in FIG. 20 as are used in FIG. 18. Apparatus 10.3 has the advantage that all the supply conduits 92 to the process vessels 94 can be located at a low level and all the return conduits from the process vessels 94 can be located at a high level. This results in the supply and return conduits 92 and 96 being easily accessible for maintenance purposes.

Figure 21:
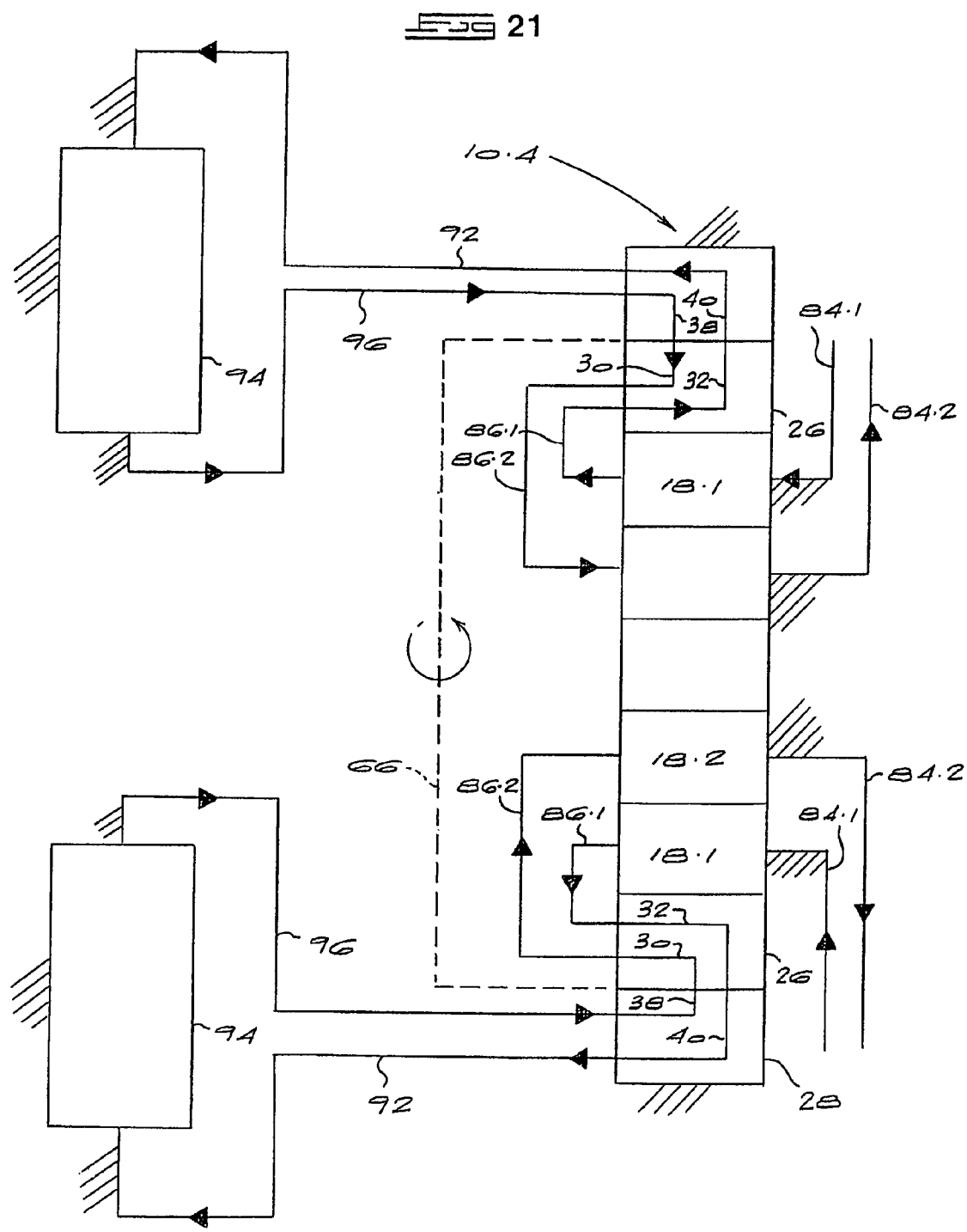
FIG. 21 is a flow diagram incorporating an apparatus according to a yet further embodiment of the invention having two pairs of double passageway indexing members.

Referring now to FIG. 21, a rotary distribution apparatus 10.4 has a lower pair of indexing members 26 and 28 and an upper pair of indexing members 26 and 28. Each indexing member has two concentric rings of passageways. Again for the sake of clarity, the same reference numerals are used in FIG. 21 as are used in FIG. 18. Apparatus 10.4 has the advantage that fluid can be fed to, and returned from, two sets of process chambers 94.

It will be appreciated that many modifications or variations of the invention are possible without departing from the spirit or scope of the invention.

The invention claimed is:
1. A rotary distribution apparatus including:
   a fixed inner distribution member with an inner conduit zone;
   a rotatable outer distribution member rotatable about the fixed inner distribution member;
   a plurality of fluid distribution chambers located between the fixed inner distribution member and the rotatable outer distribution member;
   each fluid distribution chamber having a fixed port in the fixed inner distribution member to which a fixed supply or return conduit for a fluid can in use be connected, and at least one distribution port in the rotatable outer distribution member;
   at least one indexing arrangement including a rotatable indexing member and a fixed indexing member;
   a plurality of passageways extending through each of the rotatable and fixed indexing members, the plurality of passageways each having indexing ports and connection ports with the indexing ports being provided in an indexing surface; and the connection ports of the rotatable indexing member in use being connected to the distribution ports of the distribution chambers by connecting conduits, and the connection ports of the fixed indexing member in use being connected to process chambers by fixed conduits;

so that, in use, when the rotatable outer distribution member, the rotatable indexing member and the connecting conduits are rotated, fluid fed to a fluid distribution chamber is sequentially fed to the process chambers and returned from the process chambers to other fluid distribution chambers as the indexing ports of the rotatable indexing member index relative to the indexing ports of the fixed indexing member.

2. The apparatus of claim 1 wherein the fixed inner distribution member is fixed to the fixed indexing member, and the rotatable outer distribution member is fixed to the rotatable indexing member, with the rotatable outer distribution member and the rotatable indexing member being rotatable about a common axis.

3. The apparatus of claim 1 wherein each indexing member has two concentric rings of passageways defining a plurality of pairs of passageways, with each pair of passageways consisting of a supply passageway and a return passageway.

4. The apparatus of claim 1 wherein each indexing member has a single ring of passageways.

5. The apparatus of claim 4 including two indexing arrangements located one at either end of the distribution members.

6. The apparatus of claim 1 including a pressure chamber housing for a pressure chamber so that in use the pressure of fluid in the pressure chamber maintains the indexing surface of the rotatable indexing member in contact with the indexing surface of the fixed indexing member.

7. The apparatus of claim 6 wherein the pressure chamber is located between the rotatable indexing member and the rotatable outer distribution member, and wherein the pressure chamber housing is rotatable about a common axis together with the rotatable indexing member and the rotatable outer distribution member.

8. The apparatus of claim 1 wherein the fluid distribution chambers extend circumferentially around the fixed inner distribution member.

9. The apparatus of claim 1 including at least two fluid supply distribution chambers and at least one fluid return distribution chamber.

10. The apparatus of claim 1 including seals between the fixed inner distribution member and the rotatable outer distribution member to seal the fluid distribution chambers from one another.

11. The apparatus of claim 10 wherein the seals are fixed to and rotatable with the rotatable outer distribution member.

12. The apparatus of claim 1 wherein the inner conduit zone of the fixed inner distribution member comprises a hollow core into which conduits can extend.

* * * * *